Inventor
Clarence S. Sorensen
by Wm H. Maxwell
his Attorney

Oct. 30, 1928. 1,689,537
C. S. SORENSEN
POWER TRANSMISSION
Filed Oct. 9, 1924 4 Sheets-Sheet 2

Inventor
Clarence S. Sorensen
by W. K. Maxwell
his Attorney

Oct. 30, 1928.                                    1,689,537
C. S. SORENSEN
POWER TRANSMISSION
Filed Oct. 9, 1924          4 Sheets-Sheet 3
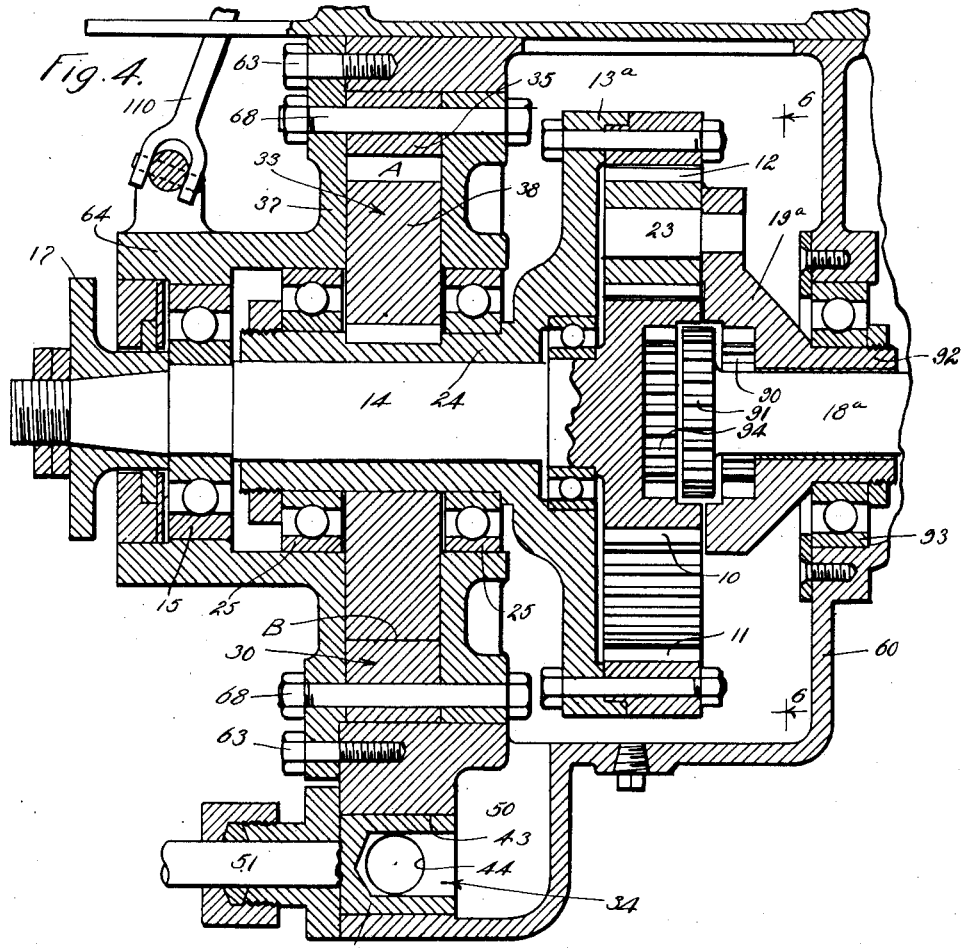
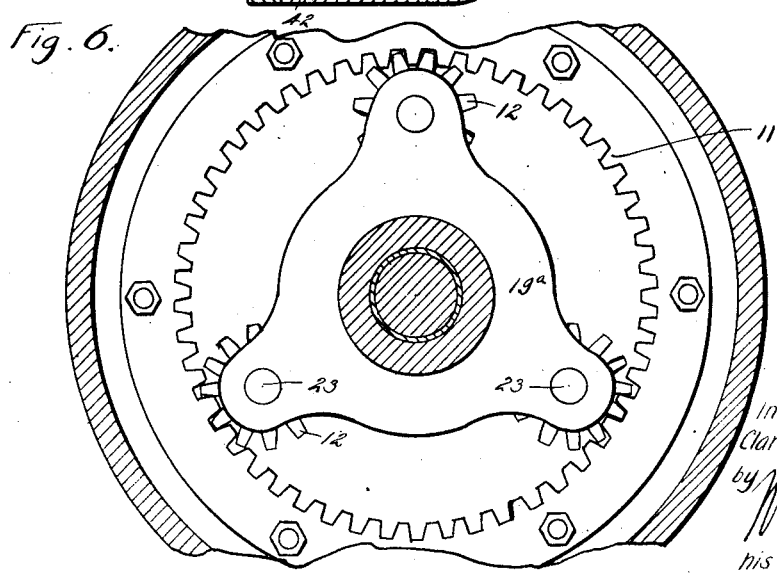
Inventor
Clarence S. Sorensen
by
his Attorney Oct. 30, 1928.

C. S. SORENSEN 1,689,537

POWER TRANSMISSION

Filed Oct. 9, 1924

Inventor
Clarence S. Sorensen
by W. H. Maxwell
his Attorney

Patented Oct. 30, 1928.

1,689,537

UNITED STATES PATENT OFFICE.

CLARENCE S. SORENSEN, OF LOS ANGELES, CALIFORNIA.

POWER TRANSMISSION.

Application filed October 9, 1924. Serial No. 742,514.

This invention relates to a drive mechanism or power transmission and it has for an object the provision of a practical, improved and effective mechanism of this character.

My present invention is useful in numerous situations and classes of machinery being particularly suited, however, to use in motor vehicles. In the present disclosure I will set forth forms of my invention suitable for use in motor vehicles, it being understood, of course, that the broader aspects of the invention contemplate various modifications and variations of the mechanism to suit various conditions or classes of work to which the invention may be applied.

An object of this invention is to provide a variable speed transmission or mechanism in which variations in speed ratio can be obtained without the engagement or disengagement of mechanical parts, such as gears, clutches, etc.

Another object of this invention is to provide a transmission in which variation of the speed ratio is controlled hydraulically.

A further object of my invention is to provide a transmission including a planetary gear mechanism and a hydraulic control for the planetary movement.

The objects and features of my invention will be best understood from the following detailed description of typical forms or embodiments of the invention throughout which description reference is had to the accompanying drawings in which Fig. 1 is a longitudinal detailed sectional view of a transmission embodying the present invention.

Fig. 4 is a longitudinal detailed sectional view of a portion of another form of mechanism embodying the present invention.

Figs. 4 and 5 when taken together show the complete mechanism.

Fig. 6 is a detailed transverse sectional view taken as indicated by line 6—6 on Fig. 4

Figure 1:
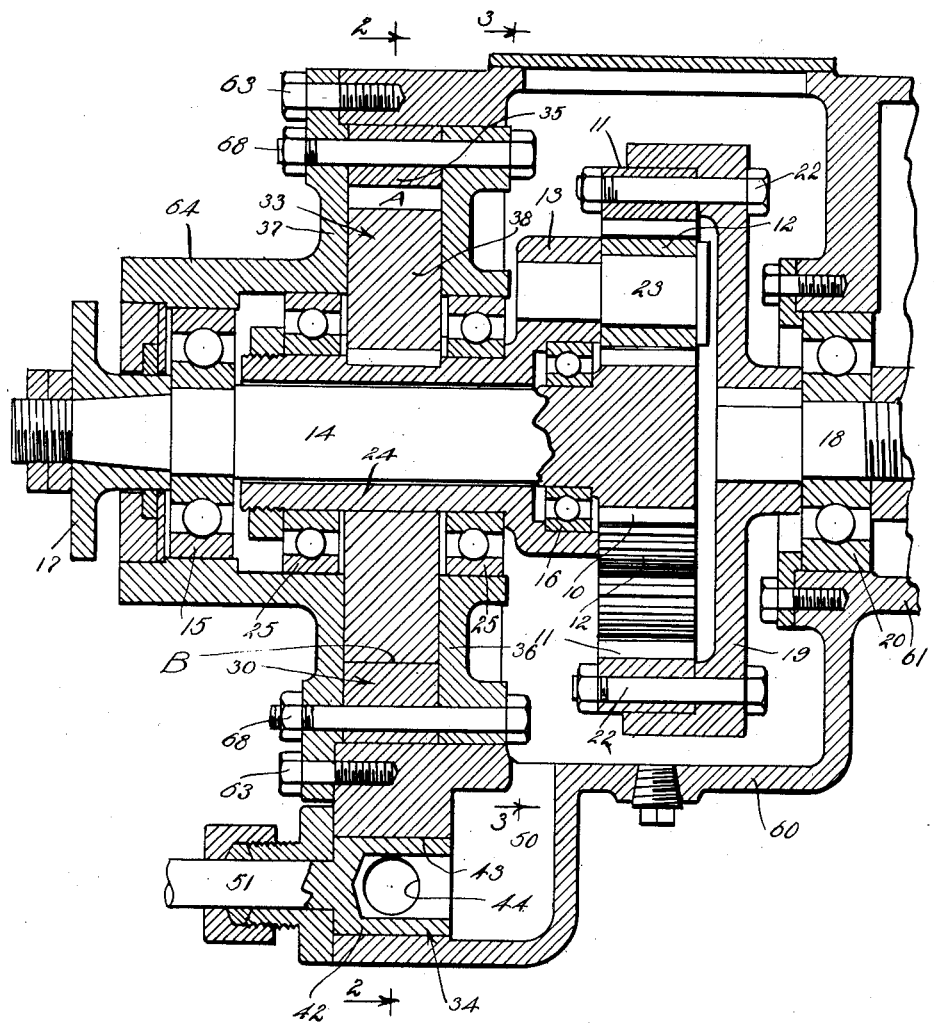
Figure 2:
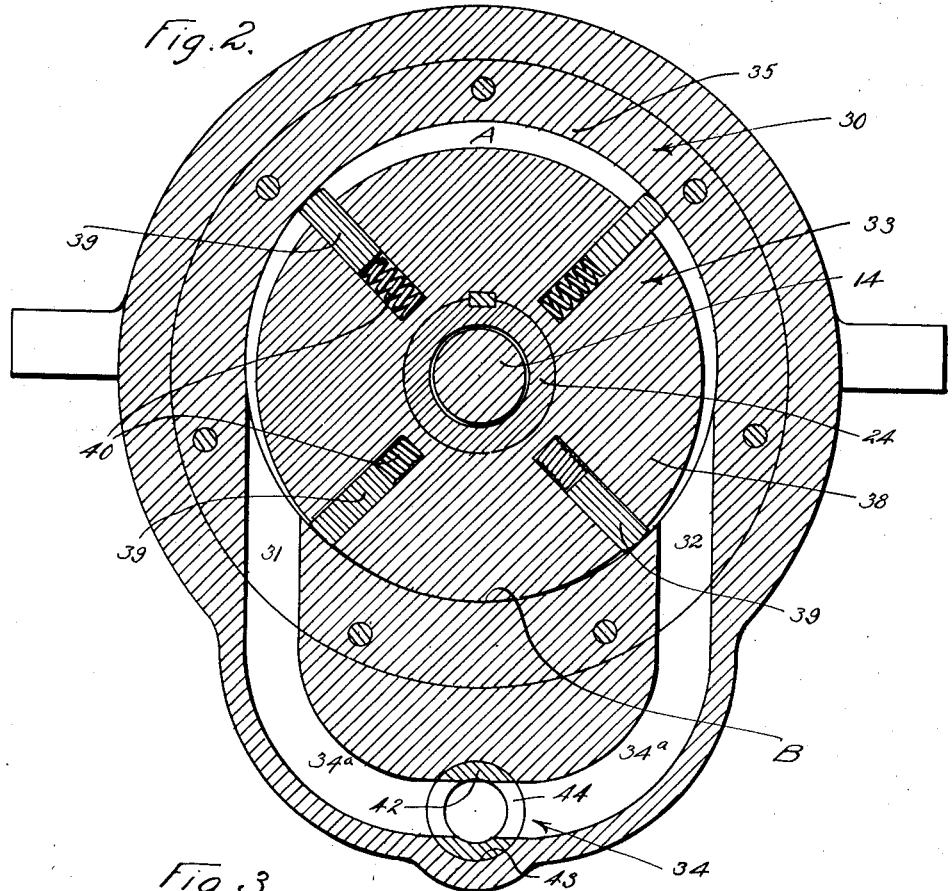
Fig. 2 is a detailed transverse sectional view taken as indicated by line 2—2 on Fig. 1.
Figure 3:
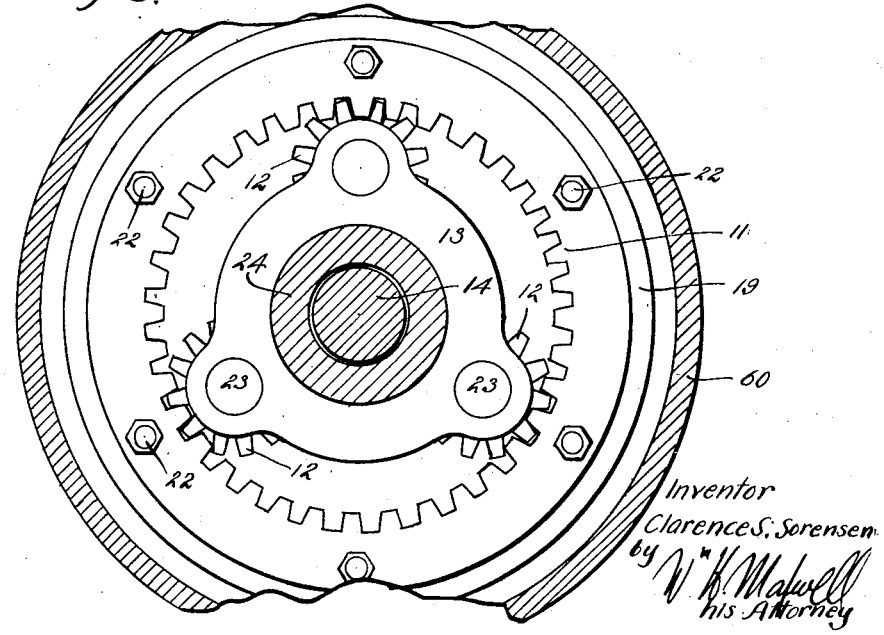
Fig. 3 is a detailed transverse sectional view taken as indicated by line 3—3 on Fig. 1.

Referring particularly to Figs. 1 to 3 of the drawings the mechanism embodying my present invention includes, generally, a planetary gear mechanism for transmitting power from the drive to the driven member and a hydraulic control for regulating or controlling the planetary gear mechanism to vary its speed ratio.

The planetary gear mechanism includes, generally, two concentric gears, an ordinary spur gear 10, an internal ring gear 11, a plurality of planet gears 12 arranged between and in mesh with the gears 10 and 11, and a planet gear carrier 13 on which the planet gears 12 are mounted. In the form of the invention now under consideration the gear 10 is the drive gear of the mechanism and is mounted on the drive shaft 14. The drive shaft 14 is mounted in suitable bearings 15 and 16 and is provided at its outer end with a coupling 17 for connection with a propeller shaft, motor, or other drive means. The drive gear 10 is, in the present case, comparatively small and is formed directly on the inner end of the shaft 14.

The internal gear 11 is the driven gear and is mounted on a driven shaft 18 through a flange member 19. The driven shaft 18 is mounted in bearings 20 so that it is concentric with the drive shaft 14 and so that its inner end is adjacent the inner end of the drive shaft. The flange member 19 is fixed on the driven shaft 18 and supports the driven gear 11 so that it is concentric with the drive gear 10 and is opposite the drive gear 10. In the preferred form of construction the driven gear 11 is formed independently of the flange member 19 and is mounted on the flange member by means of suitable bolts 22.

The planet gears 12, of which there are preferably three or more, are arranged symmetrically around the axis of the gears 10 and 11. The planet gears are designed and proportioned so that they fit between and mesh with the gears 10 and 11. The planet gears 12 are rotatably mounted on the trunnions 23 carried by the planet gear carrier 13. The planet gear carrier 13 is mounted on a control shaft 24 so that it is concentric with the gears 10 and 11. The control shaft 24 is a hollow shaft mounted freely over the drive shaft 14 in bearings 25.

The opening through the shaft 24 is sufficiently large to freely pass the drive shaft 14 so that the two shafts operate relative to each other without interference. In the particular form of construction illustrated in the drawings the planet gear carrier 13 is formed directly on the end of the shaft 14 and the bearing 16 supporting the inner end of the shaft 14 is mounted in the carrier 13.

The hydraulic control is provided by my present invention to control the operation or rotation of the floating element of the planetary mechanism and thereby control the speed ratio obtained between the drive shaft 14 and driven shaft 18. In the arrangement above described the floating element is the planet gears. The hydraulic control is in the form of a hydraulic escapement or brake mechanism for controlling rotation of the control shaft. The form of control illustrated in the drawings includes a cylindrical casing 30, having two spaced ports 31 and 32, a rotor 33 mounted for operation in the casing and a valve device 34 located in a bypass connecting the ports 31 and 32. The casing 30 is stationary and is arranged eccentrically to the axis of the control shaft 24. The casing includes, generally, an outer cylindrical wall 35, an inner side wall 36 and an outer side wall 37. The casing 30 is formed around shaft 24. The rotor 33 is fixed on the control shaft 24 within the casing and includes a round body 38 mounted concentrically on the shaft 24 and a plurality of blades 39 carried by the body so that they are operable to extend radially therefrom. The body 38 of the rotor slidably fits between the side walls 36 and 37 of the casing and is proportioned so that it engages or runs close to the outer cylindrical wall of the casing at one point B, leaving a substantial space or chamber A in the casing, as illustrated in Fig. 2. The ports 31 and 32 are formed in the outer cylindrical wall of the casing immediately on either side of the point B so that their only connection through the casing is through the space A. The blades 39 are slidably carried by the body 38 of the rotor so that they are movable radially and suitable means, for instance, springs 40 are provided for normally holding and urging the blades out so that their outer ends engage the cylindrical wall 35 of the casing. The rotor is provided with enough blades 39 so that there is always at least one blade located in the space A between the ports 31 and 32.

The ports 31 and 32 are connected by a bypass 34ᵃ and a control valve 34, including a valve member 42, is arranged in the port. In the particular case illustrated in the drawings the valve member is a cylindrical member rotatably mounted in a cylindrical seat 43. The bypass opens into opposite sides of the seat and the valve member is provided with diametrically opposite openings 44, adapted to be moved into and out of register with the bypass. The valve member is open at one end with a compartment or chamber 50 holding a supply of fluid, for instance, oil. An operating rod or shaft 51 is connected with the other end of the valve member and projects from the mechanism so that it can be conveniently operated, for instance, through a suitable control mechanism (not shown).

When the mechanism is for use in a situation such as I have referred to, it is desirable that the various gears and bearings operate in a bath of oil or other suitable lubricant. In such case I provide the mechanism with a housing which contains the various working parts and which is so constructed as to act as a container for the lubricant. In the construction provided by my present invention there is a main housing 60 which forms a general carrier for all of the parts included in the mechanism. In the particular case illustrated in the drawings the main housing 60 has an extension 61 into which the driven shaft 18 extends and in which is contained a reversing mechanism, the details of which are hereinafter described. The main housing 60 is open at the end through which the drive shaft 14 enters the mechanism. The outer side wall 37 of the casing 30 is made to close the open end of the main housing 60 and is secured to the housing by suitable cap screws 63. The outer side wall 37 is provided with a central outwardly extending cylindrical projection 64 which carries the bearings 15 and 25 supporting shafts 14 and 24, respectively. Further, in accordance with my present invention the outer cylindrical wall 35 of the casing is formed independently of the other parts of the mechanism and is secured to the inner side of the outer side wall 37. The inner side wall 36 of the casing is likewise formed independently of the other parts and is secured to the outer cylindrical wall 35. In practice the cylindrical wall 35 and inner side wall 36 may be secured to the outer side wall 37 by bolts 68. The second bearing 25 for the shaft 24 may be carried by the inner side wall 36 as illustrated in Fig. 1.

The reservoir of the hydraulic control is shown connected with the interior of the housing 60 so that there is a comparatively large body of fluid available for circulation in the control. This prevents overheating of the circulating fluid. It may be desirable in some cases to have the reservoir of the control separate from the interior of the main housing.

The construction that I have just described is noteworthy in that it is comparatively simple and inexpensive of manufacture and permits of the mechanism being readily taken apart for purpose of inspection or repair. It will be apparent that the entire mechanism is made accessible by removing the outer side wall 37 from the main housing 36. When the outer side wall 37 is removed it carries with it the entire hydraulic control mechanism and also a substantial portion of the planetary gear mechanism.

The operation of the form of the invention above described is as follows: The shaft 14 is driven through the coupling 17 from a suitable drive means. The shaft 14 drives the gear 10 of the planetary gear mechanism which in turn drives the planet gears 12 about their individual and planetary axes. The rotation of the planet gears 12 about their planetary axis depends upon the resistance to rotation of the planet gear carrier 13. In accordance with this invention the hydraulic control is provided in connection with the control shaft 24 to control the rotation of this and therefore of the planet gears about their planetary axis. When the valve device 34 is closed so that the ports 31 and 32 are completely cut off or separated, fluid in the hydraulic mechanism can not circulate between the ports and through the chamber A. When circulation of fluid is thus completely cut off the rotor 33 in the casing as the blades 39 of the rotor operate on the confined fluid. With the rotor 33 thus held against rotation the control shaft 24 to which the rotor is fixed is likewise held against rotation so that the planet gears have no planetary movement. When the planet gears are held against planetary movement the minimum speed ratio, in the present case, speed reduction, is obtained between the drive shaft 14 and driven shaft 18. The speed ratio between the drive and driven shaft will, when the planet gear carrier is held against rotation, depend upon the proportioning of the drive gear and driven gear. When it is desired to vary the speed ratio between the drive shaft and driven shaft 18 so that the driven shaft is driven slower with relation to the drive shaft 14 the valve device 34 is opened to allow the proper amount of circulation of fluid in the hydraulic mechanism thereby allowing the rotor 33 to rotate and giving the planet gears the necessary planetary movement. The amount of opening of the valve 34 will determine the amount of circulation of fluid in the hydraulic mechanism and therefore the rate of rotation of the rotor and the rate of planetary rotation of the planet gears.

In Figs. 4 to 7 of the drawings I illustrate a form of the invention somewhat different from that hereinabove described. In these figures I illustrate a form of the invention which may be considered the preferred form for use in the usual type of vehicle drive. This preferred form of the invention has several very distinct advantages over the form hereinabove described; for instance, it is such that the driven member rotates in the same direction as the drive member, means is provided whereby the drive and driven member may be directly connected so that they are operated at the same speed and so that the driving strain is not communicated through the planetary gear mechanism, a unique control is provided for the reverse and direct drives, etc.

In the preferred form of the invention the planetary gear mechanism includes, generally, two concentric gears, an ordinary spur gear 10, an internal ring gear 11, and a plurality of planet gears 12 arranged between and in mesh with the gears 10 and 11. In this case the gear 10 is the drive gear, the planet gears 12 are the driven gears and the internal gear 11 is the floating element or the member through which the planetary mechanism is controlled or regulated. The drive gear 10 is mounted on drive shaft 14 supported in bearings 15 and 16 and is provided at its outer end with a coupling 17.

The internal control gear 11 is rotatably mounted concentrically with the drive gear 10. The gear 11 is fixed on a flange member 13$^a$ provided on a shaft 24. The shaft 24 is a hollow shaft freely mounted over the drive shaft 14 in bearings 25. The shaft 24 forms a connection between the hydraulic control and the control gear 11 of the planetary gear mechanism whereby rotation of the gear 11 is regulated or controlled by the control mechanism.

The planet gears 12, of which there are preferably three or more, are arranged symmetrically around the axis of the gears 10 and 11 and so that they are in mesh with both the gears 10 and 11. The planet gears 12 are rotatably mounted on trunnions 23 carried by a planet gear carrier 19$^a$ related to the driven shaft 18$^a$. By this arrangement the planetary movement or rotation of the planet gears 12 is transmitted from the planet gears to the driven shaft through the carrier 19$^a$.

There is a releasable driving connection between the planet gear carrier 19$^a$ and the driven shaft 18$^a$. This releasable connection is provided for the purpose of disconnecting the drive through the planetary gear mechanism upon connection of the direct drive about to be described. In the form of construction illustrated in the drawings the releasable connection is in the form of a positive clutch device. The clutch device includes a plurality of clutch members or teeth 90 formed on the planet gear carrier and a plurality of clutch members or teeth 91 connected with the driven shaft 18$^a$. In this particular case the driven shaft 18$^a$ is movable longitudinally for the purpose of moving the clutch teeth 91 into and out of co-operative engagement with the clutch teeth 90. I have illustrated the clutch teeth 90 in the form of internal gear teeth formed in the planet gear carrier and the clutch teeth 91 in the form of ordinary gear teeth formed directly on the inner end of the driven shaft 18ᵃ. When the clutch teeth 91 are in engagement with the clutch teeth 90 the planet gear carrier and driven shaft are positively connected so that they rotate together, however, when the clutch teeth 91 are out of engagement with the clutch teeth 90, as I have illustrated in Fig. 5, the planet gear carrier and driven shaft are disconnected so that they are rotatable independently. The planet gear carrier is provided with a hub 92 supported in the housing by a bearing 93. The driven shaft 18ᵃ is rotatably supported in the hub 92 of the planet gear carrier.

Figure 5:
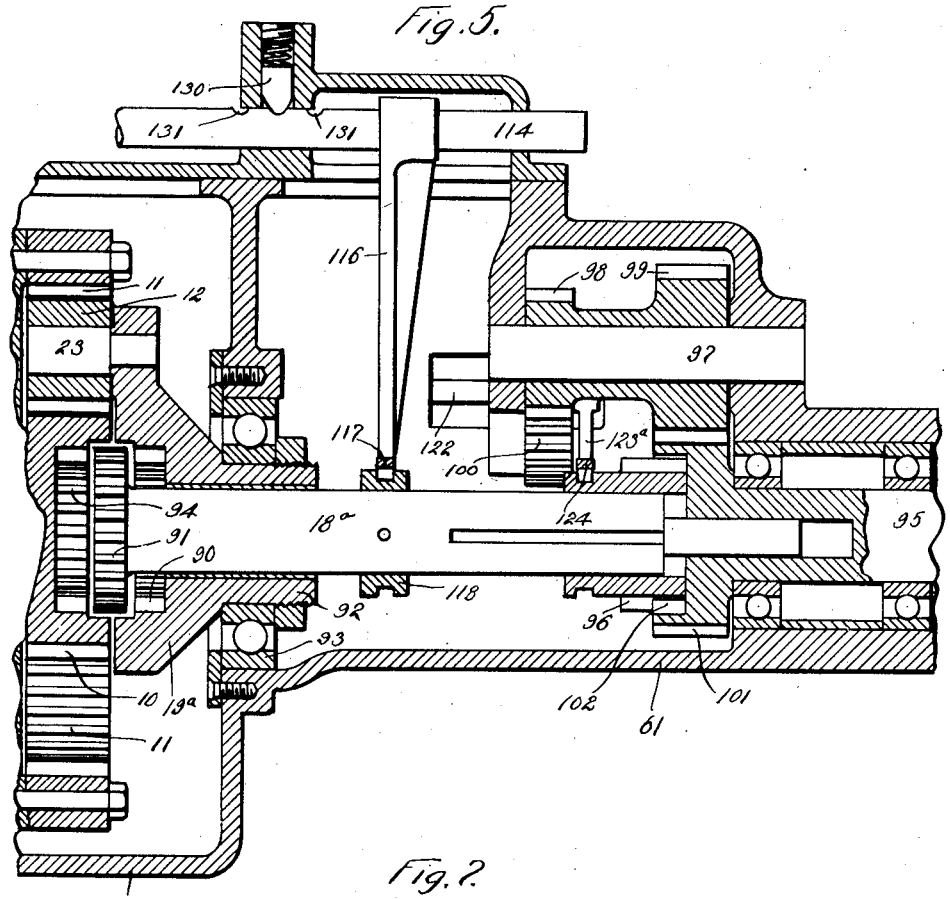
Fig. 5 is a longitudinal detailed sectional view of the remaining portion of the mechanism illustrated in Fig. 4.
Figure 7:
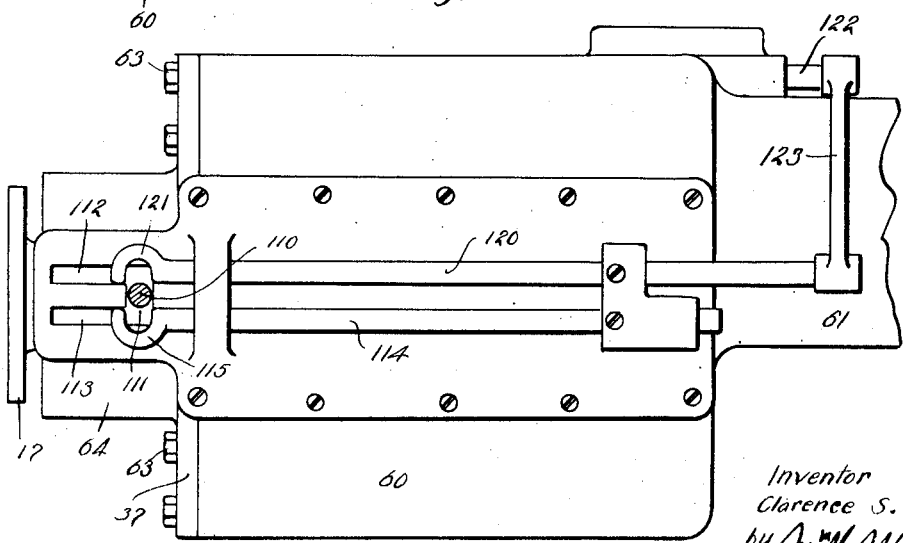
Fig. 7 is a plan view of the mechanism illustrated in Figs. 4 and 5 illustrating the arrangement of the shifting mechanism.

In this form of the invention means is provided for directly connecting the drive and driven shafts 14 and 18ᵃ, respectively, in order that the driven shaft 18ᵃ may be driven at the same speed as the drive shaft and without transmission of power through the planetary gear mechanism. In its preferred form this means is in the form of a releasable connection at the adjacent ends of the drive and driven shafts which connection is preferably in the form of a positive clutch. In the drawings I have illustrated clutch teeth 94 on the drive shaft to cooperate with clutch teeth on the driven shaft. The clutch teeth 91 provided on the driven shaft as hereinabove described may be employed for cooperation with the clutch teeth 94 of the drive shaft. In this case the clutch teeth 94 are in the form of internal gears on the end of the drive shaft corresponding to the internal gear teeth in the planet gear carrier. The driven shaft 18ᵃ is movable from a neutral position, such as is illustrated in Fig. 5, in one direction to engage the teeth 91 with the teeth 90 and in the other direction to engage the teeth 91 with the teeth 94. When the teeth 91 of the driven shaft are in engagement with the teeth 94 of the drive shaft the two shafts are positively and directly connected together so that they rotate together. It is to be noted that this construction makes it impossible for both clutch connections, that is, the clutch connection between the driven shaft and the planetary gear carrier, and that between the driven shaft and the drive shaft, to be in engagement at the same time.

The mechanism is provided with a reversing mechanism whereby extension 95 of the driven shaft 18ᵃ may be reversed as to its direction of rotation. I have chosen to illustrate in the drawings a more or less usual form of reversing gear including a sliding gear 96 slidably keyed to the driven shaft 18ᵃ, a counter-shaft 97 carrying connected gears 98 and 99, a reversing gear 100 meshing with the gear 98, a gear 101 fixed on the extension 95 in mesh with the gear 99 and means for releasably connecting driven shaft 18ᵃ and extension shaft 95 for directly connecting the two shafts. The sliding gear 96 is movable along the driven shaft 18ᵃ into and out of mesh with the reversing pinion 100. The means for directly connecting the shafts 18ᵃ and 95 may include clutch teeth or internal gear teeth 102 formed in the end of the gear 101 on shaft 95 for cooperation with the teeth of gear 96. The gear 96 in addition to being shiftable into mesh with the reversing pinion 100 is shiftable into engagement with the clutch teeth 102. When the gear 96 is in cooperative engagement with the teeth 102 the two shafts 18ᵃ and 95 are directly and positively connected to rotate together and in the same direction. When the gear 96 is in mesh with the reversing pinion 100 the drive from the driven shaft 18ᵃ to the extension 95 is through the reversing pinion 100, gears 98 and 99 and the gear 101. This train of gears reverses the direction of rotation so that the extension shaft 95 rotates opposite to the driven shaft 18ᵃ. The parts are arranged and proportioned so that the sliding gear 96 has a neutral position between the two positions just mentioned and therefore cannot be arranged in a manner to make both connections simultaneously.

An interconnection and control means is provided for the various releasable connections embodied in the mechanism which means is in the form of a control and will be termed a shifting mechanism, so that it will not be confused with the hydraulic control means. The shifting means includes a single shift lever 110 and connections between the shift lever and the shiftable parts, that is, the driven shaft 18ᵃ and sliding gear 96, whereby said parts are maintained in proper relation and can be conveniently operated. Shift lever 110 is mounted at the exterior of the housing so that it is movable in a direction longitudinal of the mechanism and also in a direction transverse of the mechanism. The lever is provided with a guide member having a transverse slot 111 for guiding the lever in its transverse movement and two longitudinal slots 112 and 113 for guiding the lever in its longitudinal movements. The connection between the lever 110 and the driven shaft 18ᵃ, by which the driven shaft can be shifted or moved longitudinally, may include a sliding shaft 114 provided with a head 115 which connects it with the shift lever 110 when the lever is in the longitudinal slot 113. The shaft 114 has a part in communication with the interior of the housing and carrying an arm 116. The arm is provided with a yoke portion 117 connecting it with a grooved collar 118 fixed on the shaft 18ᵃ.

When the shaft 114 is shifted or moved longitudinally by operation of the control lever in the longitudinal slot 113 the arm 116 is operated to shift the driven shaft 18ª longitudinally.

The connection between the control lever 110 and the sliding gear 96 may include a shiftable shaft 120 provided at one end with a head 121 for connecting it with the shift lever when the lever is in the longitudinal slot 112. The shaft 120 is operatively connected with a counter-shaft 122 through an arm 123 at the exterior of the housing. The counter-shaft 122 has a part in communication with the interior of the housing carrying an arm 123ª. The arm 123ª is provided with a yoke 124 which connects it with the shiftable gear 96. When the shift lever 110 is moved longitudinally in the longitudinal slot 112 the shaft 120 is moved longitudinally causing operation of the shaft 122 and movement of the arm 123ª to shift the gear 96. It will be noted from inspection of Fig. 7 of the drawings that the transverse groove 111 connects the ends of the longitudinal slots 112 and 113 and that the heads 111 and 121, provided on the shafts 114 and 120, respectively, are such that the shift lever is movable into and out of connection with them only at the transverse slot 111. The parts are so arranged and proportioned that the shiftable gear 96 is in cooperative engagement with the clutch teeth 102 to directly connect the shafts 18ª and 95 when the head 121 on the shaft 120 is in its normal unactuated position opposite the transverse slot 111 while the shaft 18ª is in position where the clutch teeth 91 are in mesh with the clutch teeth 90 to connect the drive and driven shafts, through the planetary gear mechanism when the head 115 on the shaft 114 is in its normal unactuated position opposite the transverse slot 111. It will thus be seen that the normal unactuated position of the mechanism is with the drive shaft 14 connected with the driven shaft 18ª through the planetary gear mechanism and the driven shaft 18ª connected with the extension 95 directly through the shiftable gear 96 and clutch teeth 102 so that the shaft 95 is driven in the same direction as the shaft 18ª. From the foregoing description it will be clear that the reverse drive of the extension shaft 95 can only be obtained when the drive and driven shafts are connected through the planetary gear mechanism and therefore cannot be put in operation when the direct or high speed connection is made between the drive and driven shafts. This proper relationing of the releasable connections is maintained by the control slots hereinabove described. The shafts 114 and 120 may be yieldingly held in their various positions by spring pressed plungers 130 cooperating with notches 131 suitably located in the shafts.

It will be understood, of course, that the hydraulic control mechanism associated with the control shaft 24 in this form of invention may be the same as that set forth of the form of the invention first described. Further, it will be apparent that various structural features and details, such as the general arrangement of parts, means of lubrication, housing, etc. may be substantially the same in this form of the invention as in the form first described. The preferred form of the invention operates in very much the same manner as the form of the invention first described. The drive shaft 14 operates the drive gear 10, which in turn operates the other members of the planetary gear mechanism. In this case, where the planet gears drive the driven shaft by virtue of their planetary movement, the speed ratio between the drive and driven shafts is controlled by or through the internal gear 11; for instance, when the internal gear 11 is held against rotation through suitable setting of the control means there is a maximum planetary movement of the planetary gears and therefore a minimum speed reduction between the drive and driven gears. If the internal gear 11 is released, by opening the control valve, to have rotation, it will decrease or reduce the planetary movement of the planet gears and thereby increase the speed ratio between the drive and driven shafts. When the internal gear is held against rotation so that there is a minimum speed reduction between the drive and driven shafts and it is desired to further decrease or reduce the speed ratio, for instance, when it is desired to directly connect the two shafts, the shift lever is operated to directly connect the drive and driven shaft; this operation as before described automatically disconnects the connection between the planetary gear mechanism and the driven shaft. At any time while the drive and driven shafts are connected through the planetary gear mechanism the reverse gear can be thrown into operation by shifting the shiftable gear 96 to connect the driven shaft 18ª and extension 95 through the gear train above described. In practice the engagement and disengagement of the various connections above referred to are preferably made when a clutch or other general control, such as is usual in the drive of a vehicle, or the like, is momentarily released.

Having described only a typical preferred form of my invention I do not wish to limit myself to the specific details hereinabove set forth, but wish to reserve to myself any changes or variations that may appear to those skilled in the art or fall within the scope of the following claims.

Having described my invention, I claim:

1. A drive including, a drive shaft, a driven shaft, a drive gear on the drive shaft, an internal gear concentric with the drive gear, a planet gear between the drive gear and internal gear, a carrier for the planet gear, a releasable driving connection between the carrier and driven shaft, and means for releasably connecting the drive and driven shafts directly together.

2. A drive including, two shafts arranged end to end, one a drive shaft the other a driven shaft, a drive gear on the drive shaft, an internal gear, a planet gear between the drive gear and internal gear, a carrier for the planet gear, a releasable driving connection between the carrier and driven shaft, and a clutch for connecting the adjacent ends of the shafts directly together.

3. A drive including, a drive shaft, a driven shaft, two releasable drive connections between the shafts one for directly connecting the shafts and the other a variable planetary gear connection, releasable reversing means in connection with the driven shaft, and a control whereby the reversing means can be put into operation only when the planetary gear drive is in operation.

4. A drive including, a drive shaft, a driven shaft, two releasable drive connections between the shafts one for directly connecting the shafts and the other a variable planetary gear connection, releasable reversing means in connection with the driven shaft, a control for the releasable connections and the reversing means whereby they are operable from a single member, and means whereby the reversing means can be put into operation only when the planetary gear drive is in operation.

5. A drive including, a drive shaft, a driven shaft, two releasable drive connections between the shafts one for directly connecting the shafts and the other a variable planetary gear connection, releasable reversing means in connection with the driven shaft, a control for the releasable connections and the reversing means whereby they are operable from a single member, and a guide for said member whereby the reversing means can be put into operation only when the planetary gear drive is in operation.

In witness that I claim the foregoing I have hereunto subscribed my name this 16th day of Sept., 1924.

CLARENCE S. SORENSEN.